H. P. LAMOREAUX.
FISH SLIMER.
APPLICATION FILED OCT. 20, 1913.
1,116,082.
Patented Nov. 3, 1914.
3 SHEETS—SHEET 3.
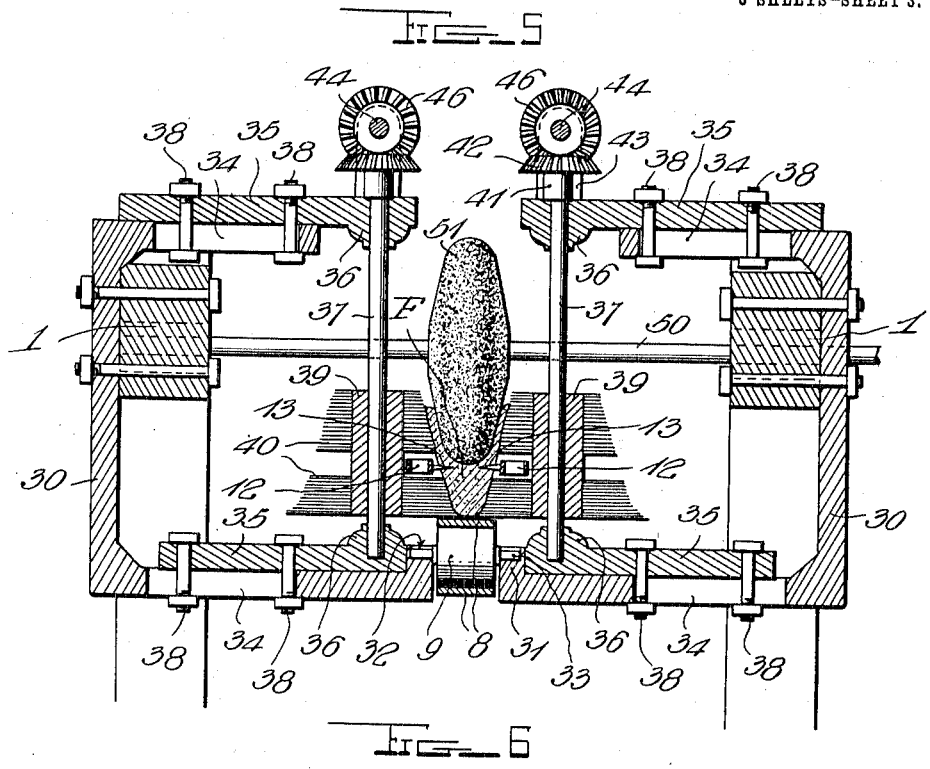
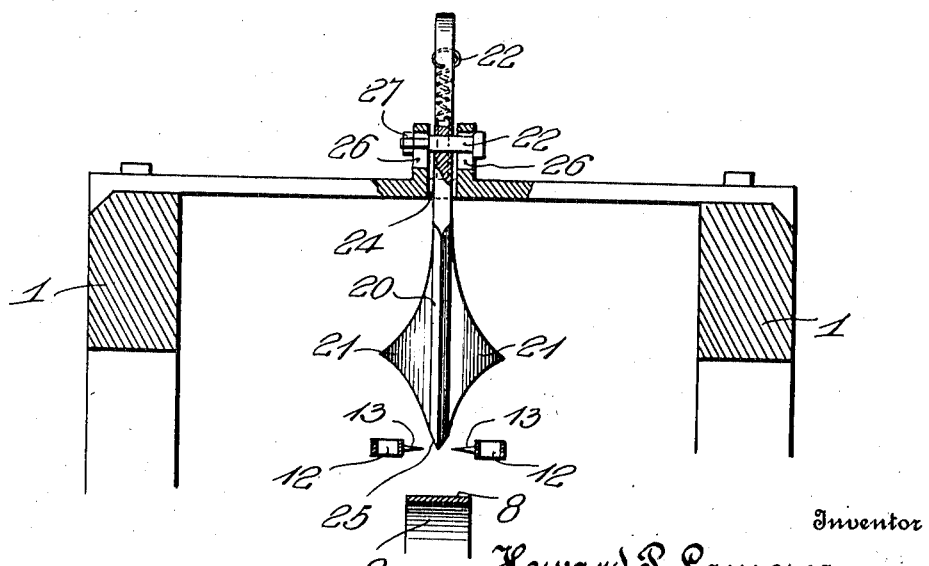
Witnesses
C. Munker
E. D. Haines
Inventor
Howard P. Lamoreaux
By H. B. Willson & Co.
Attorneys

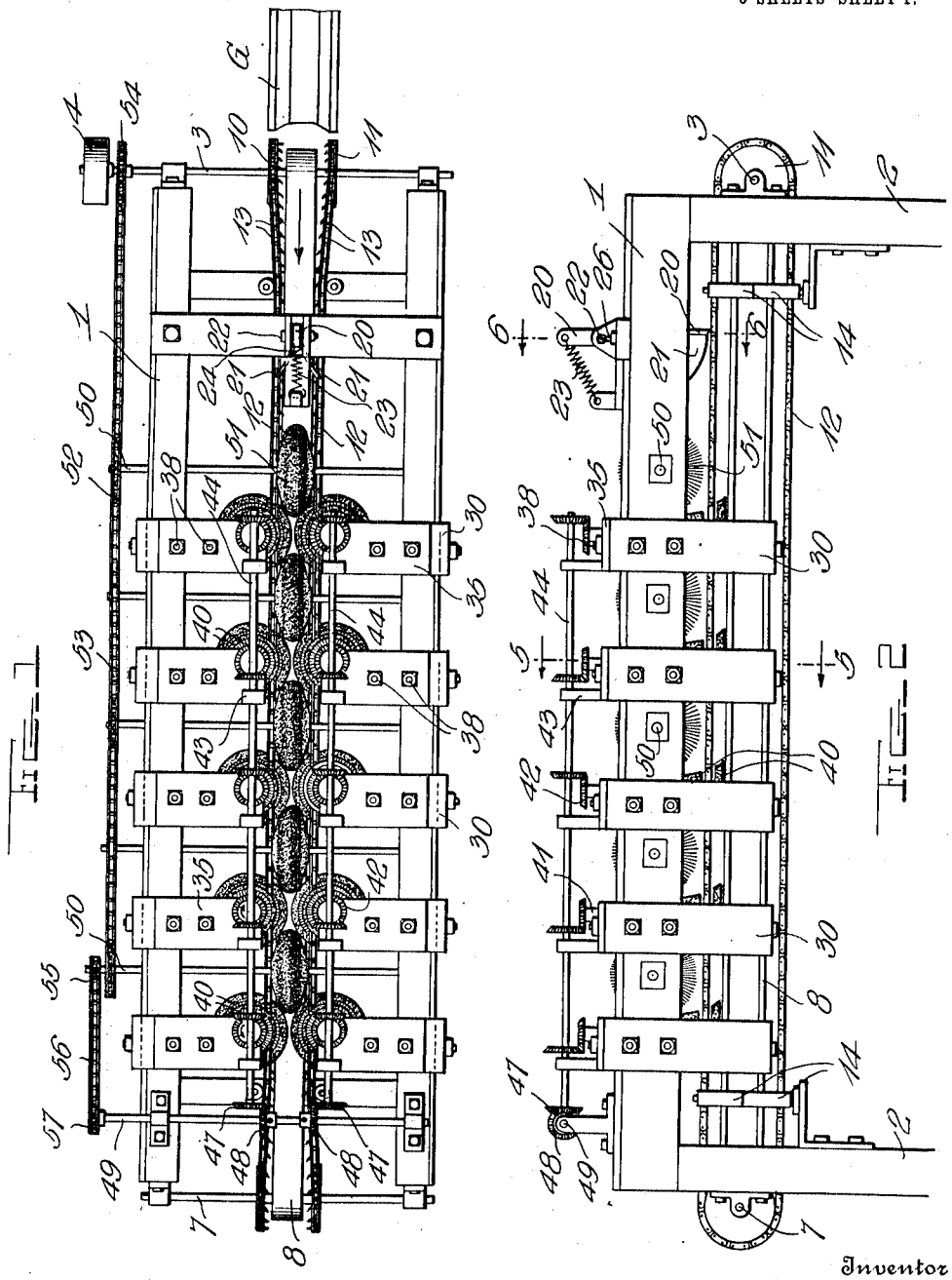

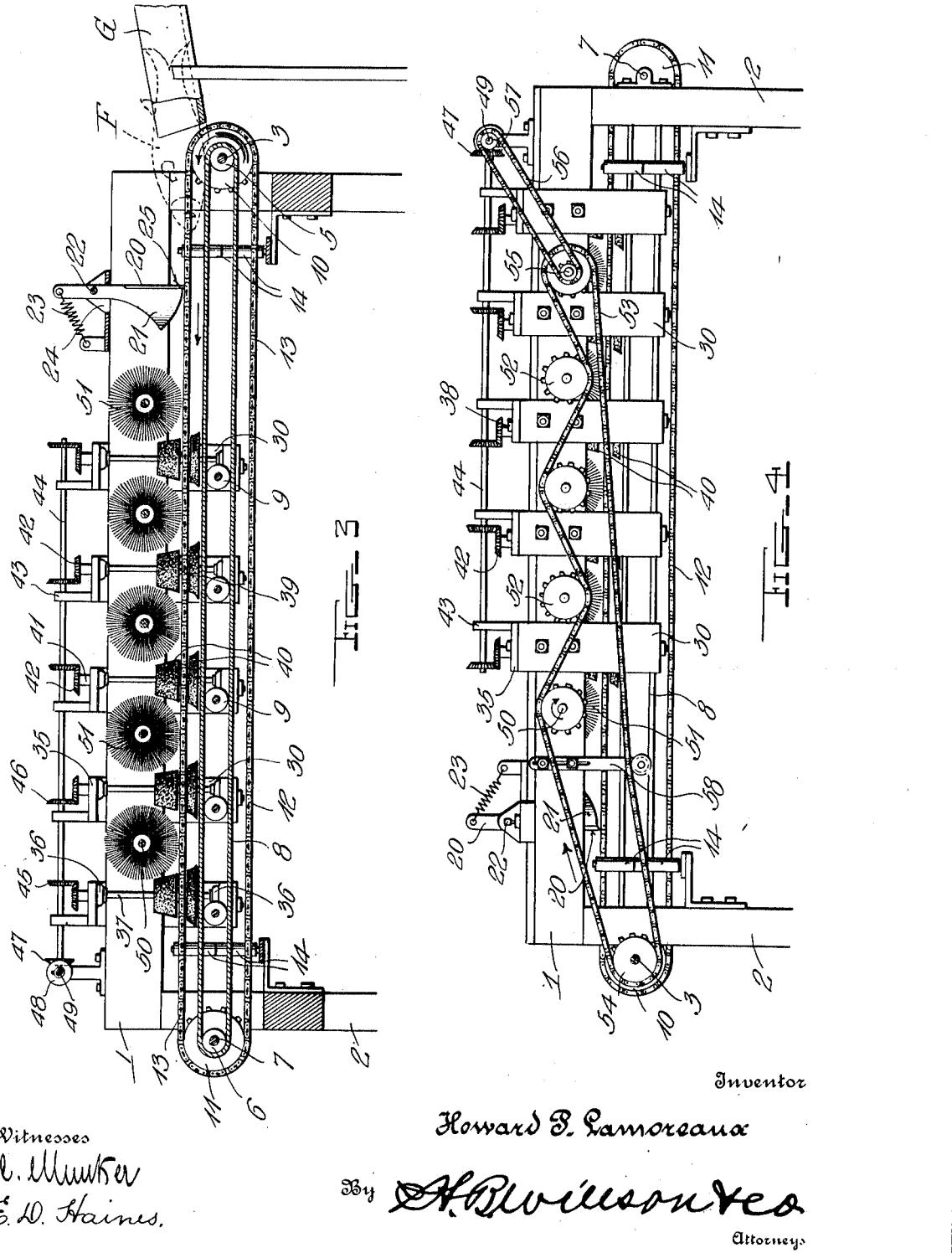

UNITED STATES PATENT OFFICE.

HOWARD P. LAMOREAUX, OF MARIETTA, WASHINGTON.

FISH-SLIMER.

1,116,082.   Specification of Letters Patent.   Patented Nov. 3, 1914.

Application filed October 20, 1913. Serial No. 796,271.

*To all whom it may concern:*

Be it known that I, HOWARD P. LAMOREAUX, a citizen of the United States, residing at Marietta, in the county of Whatcom and State of Washington, have invented certain new and useful Improvements in Fish-Slimers; and I do declare the following to be a full, clear, and exact description of the invention, such as will enable others skilled in the art to which it appertains to make and use the same.

This invention relates to machines for dressing fish and the like, and more especially to fish which are covered with slime; and the object of the invention is to produce a machine which will cut open and dress the fish by removing the entrails and will simultaneously brush and wash the slime from the outside of the fish so that when it passes out the rear end of the machine it is in condition for the canning process. In this and in several sections of the country fish of this kind are gathered in large quantities and brought to the cannery, and the general purpose of this machine is to prepare them for canning by machinery rather than by hand. A feature of the invention is the adjustability of its brushes so as to adapt it to different kinds of fish of different sizes or to the same kind of fish at different times of the year before or after they have attained their full growth. It is contemplated although it is not herein illustrated, that the upright brushes shown in the drawings could be replaced by others having stiffer bristles—perhaps of wire or even of rods—so that certain kinds of fish could be scaled by the machine. Details of the latter will be found in the following specification and are shown in the accompanying drawings wherein—

Figure 1 is a plan view of the machine complete, Fig. 2 is a left side elevation, Fig. 3 a central longitudinal sectional view, and Fig. 4 a right side elevation; and Figs. 5 and 6 are cross sections on the lines 5—5 and 6—6 respectively of Fig. 2.

The frame 1 of this machine is mounted on suitable legs 2 which by preference stand on a slatted floor or over a proper receptacle into which the slime and water are collected, but if the machine be placed in perhaps that portion of the cannery which extends out over the water and the floor slatted, the refuse will run through the floor without further attention. The proportions and materials of the parts of the frame are not essential to the invention, but by preference the power shaft 3 is mounted across one end, and power is applied to a pulley 4 thereon from any suitable source. On this shaft at the transverse center of the frame is a drum 5 which is connected with a similar drum 6 mounted on an idle shaft 7 at the rear end of the frame, by an endless belt 8 traveling over idlers 9 so that the upper stretch thereof will be held substantially horizontal. Alongside the drums 5 and 6 are pairs of sprocket wheels 10 and 11 connected respectively by chains 12 whereof each link has a finger or projection 13 on its inner face and inclined in the direction of movement of the upper stretch of the chain; and these chains pass between upright rollers 14 near the sprocket wheels so that the chains are borne inward toward the edges of the belt 8 and travel with the same and at the same speed throughout the length of the machine, diverging again from said edges at the rear end of the machine as seen in Fig. 1.

Just in rear of the forward pair of rollers 14 the frame carries an upright knife 20 whose body has forwardly convergent wings 21 in rear of its cutting edge as best seen in Figs. 1 and 6 and whose shank is pivoted at 22 to a suitable support on the frame while its upper end is drawn normally to the rear by a spring 23, the support having a slot 24 which limits the movement of the knife under the impulse of said spring. The knife normally stands upright as seen in Fig. 3 with its shank against the front end of the slot 24 and its cutting edge 25 depending to a point about opposite the fingered or toothed chains 12 as seen in Fig. 6. If, however, it is desired to adjust the height of the lower end of the cutting edge, the pivot 22 may be formed in the shape of a bolt as illustrated in this view, and the support may be slotted as shown at 26, so that by loosening the nut 27 the bolt and therefore the entire knife can be set higher or lower, after which the nut is tightened to hold the parts in adjusted position. The spring 23 need not be adjusted as the movement of the shank of the knife is slight during such adjustment. If an obstruction should strike the cutting edge of the knife, its shank rocks on the pivot bolt 22 as the rear end of the slot 24 will permit.

The side bars of the frame 1 carry U-shaped brackets 30 at intervals (see Fig. 3) and the lower arm of each bracket has its inner end upbent as at 31 and notched as at 32 for the reception of the stub shaft 33 of the idler 9, thereby permitting the removal of the latter and its replacement by a different one if desired. Both the upper and lower arms of each bracket are slotted as at 34, and overlying these arms are bars 35 having bearings 36 for upright shafts 37. Each bar is adjustably mounted on one arm of each bracket by means of bolts 38 passing through the slots 34 as shown, with the result that the exact position of the shaft and the parts carried by it may be adjusted. Fixed on each shaft between its two bearings 36 is the hub or body 39 of a conical brush 40, the bristles of which may be of any suitable material as first above suggested in this specification, but are preferably longer toward the lower end of the hub 39 than at the upper end so as to approximate the shape of the sides of the fish F as shown. The upper end of each shaft 37 is shouldered as at 41 and carries a bevel gear 42 above said shoulder. Each bar 35 by preference carries an upright 43, and through all the uprights on the various bars is journaled a horizontal shaft 44 which has bevel gears 45 and 46 meshing respectively with the opposite sides of the series of bevel gears 42 on the upright shafts 37. The purpose of this particular disposition of the driving gears 45 and 46 is to cause the various shafts to rotate in opposite directions as indicated by the arrows on Fig. 1, and if the driving gears for the shafts at the other side of the center of the machine are appropriately arranged, the result will be that one pair of upright brushes 40 will be rotated in a direction to assist in feeding the fish forward, while the next pair will be rotated in a reverse direction, and the same throughout the length of the machine. The rear ends of the two drive shafts 44 carry beveled gears 47 meshing with similar beveled gears 48 on a cross shaft 49 which is journaled across the frame and driven by means yet to be described.

Journaled in suitable bearings in the side bars of the frame and extending entirely across the same are shafts 50, preferably corresponding in number with the pairs of conical or upright brushes 40 as seen in Fig. 3, and each shaft carries a horizontal brush 51 whose active edge depends between the sides of the fish as shown in Fig. 5. The various shafts 50 extend through one side bar of the frame as seen in Fig. 4 and carry sprocket gears 52 which are driven by a chain belt 53 passed over one gear and under the next so as to rotate the shafts 50 alternately or oppositely to each other in a manner which will be clear. This belt may be driven by a sprocket wheel 54 on the right end of the power shaft; and the rearmost shaft 50 may have a sprocket wheel 55 connected by a chain or belt 56 with another sprocket wheel 57 on the adjacent extremity of the cross shaft 49, so that power is communicated thereby to the drive shafts 44 for the upright brushes 40. A belt tightener 58 is by preference disposed somewhere on the frame so that slack in the chain belt 53 can be taken up.

With the parts constructed as above described, the operation of this device is as follows: The fish indicated in dotted lines at F in Fig. 3 is fed to the machine over a table or through a suitable guide G, and dropped onto the forward end of the upper stretch of the belt 8 between the sprocket wheels 10 and 11 where it is grasped by the teeth or fingers of the two chains 12. The latter converge until they pass between the rollers 14, and therefore the teeth or fingers 13 are caused to enter into the sides of the fish which is thereby grasped and held upright as its back rests on the belt 8. Being in this manner carried forward, the fish passes next under the lower end of the cutting edge 25 of the knife 20 and is cut open along its belly. Next it passes under the horizontal brush 51 which is the first of the series of five such shown in Fig. 3, and rotates in the direction indicated by the arrow in Fig. 4; next the fish passes between the first pair of upright brushes 40 where its sides and back are acted on by the bristles thereof, and thereafter it passes alternately under the horizontal brush and between the upright brushes throughout the two series as indicated—finally falling off the rear end of the belt 8 into a suitable receptacle. Meanwhile water may be sprayed onto the fish as by means of a hose or otherwise, and the result is that the horizontal brushes remove the entrails from within the fish and the upright brushes remove the slime from the outside of the fish so that, by the time it passes out of the machine, it is clean enough for canning as soon as the head and tail and important fins have been removed. If the fish be wider or thicker than as indicated at F in Fig. 5, the bolts 38 are loosened and the upper and lower bars 35 are set a little farther out so that the upright shafts 37 and their brushes 40 stand slightly further remote from each other than shown. If the fish be not so deep as or deeper than illustrated in this view, other idlers 9 may be substituted so that the upper stretch of the belt 8 is raised or lowered as will be clear. When such adjustments are effected, it is quite possible that the knife 20 will have to be set higher or lower as indicated in Fig. 6. If through any mistake an extra large-sized fish is fed into the machine, the bristles of the brushes may yield as will be necessary and the pivotal arrangement of the knife 20 permits it to deflect to the rear and stretch the spring 23 in a manner already described. While I have shown my preferred form of power shaft and connections between it and the various shafts which actuate the several cleaning brushes, I do not wish to be limited in this respect, nor is it absolutely necessary that there be five horizontal rollers nor five pairs of upright brushes, as the machine may be amplified to a considerable extent if desired. Furthermore, while I have described my invention in detail, it will be understood that I do not desire to be limited to the constructions of the various parts, as deviations will have to be made in some respects which will not affect the main features of the machine or in any way mar its efficiency. And furthermore it will be understood that various changes in the form, proportions and in the minor details of construction may be resorted to without departing from the spirit or sacrificing any of the advantages of the invention.

What is claimed as new is:

1. In a fish slimer, the combination with means for carrying the fish through the machine in an upright position; of a series of pairs of brushes mounted on vertical axes, means for rotating them to remove the slime from the exterior of the fish, a knife at the front end of the machine for opening the fish, and a series of brushes mounted on horizontal axes and disposed between the pairs of upright brushes for removing the entrails of the fish, said horizontal brushes rotating alternately in reverse directions, for the purpose set forth.

2. In a fish slimer, the combination with means for carrying the fish through the machine in an upright position, and a knife at the front end of the machine for opening the fish; of a series of pairs of upright brushes located on opposite sides of the path followed by the fish and rotating alternately in reverse directions, and an independent series of brushes mounted on horizontal axes and rotated alternately in reverse directions, all as and for the purpose set forth.

3. In a machine for sliming fish, the combination with the frame, transverse shafts at the ends of the frame, a drum on each shaft and a pair of sprocket wheels also thereon remote from the ends of the drum, a belt connecting the drums, two chains connecting the respective sprocket wheels, each link of each chain having an inwardly projecting finger, a pair of upright rollers near each shaft pressing the chains toward the edges of said belt, idlers for supporting the upper stretch of the belt, and means for rotating one of said shafts; of a knife for opening the fish as it is carried forward by said belt and chains, and means in rear of the knife for cleaning the fish.

4. In a machine for sliming fish, the combination with a frame, transverse shafts at the ends of the frame, a drum on each shaft and a pair of sprocket wheels also thereon remote from the ends of the drum, a belt connecting the drums, two chains connecting the respective sprocket wheels, each link of each chain having an inwardly projecting finger, a pair of upright rollers near each shaft pressing the chains toward the edges of said belt, a series of idlers underlying the upper stretch of said belt and having stub shafts projecting from their extremities, the frame having notches in which said stub shafts are removably mounted, and means for driving one shaft and moving the belt and chains in unison; of a knife for opening the fish as it is carried forward by said belt and chain, and means for brushing the interior and exterior of the fish during its passage throughout the length of the machine.

5. In a machine of the class described, the combination with a frame, a series of U-shaped brackets secured to the side bars thereof and having slots in their horizontal arms, the inner ends of the lower arms being upturned and provided with notches, a series of idlers having stub shafts removably mounted in said notches, and a fish-carrying belt moving throughout the length of the machine with its upper stretch passing over said idlers and between said brackets; of bars overlying the arms of said brackets and having bearings, bolts through said bars and slots whereby the former are adjustably mounted on the brackets, upright shafts journaled in said bearings, upright brushes whose hubs are mounted on said shafts and whose bristles clean the outside of the fish, and means for rotating said shafts.

6. In a machine of the class described, the combination with a frame, a series of brackets secured to the side bars of said frame and a fish carrying member moving through the length of the machine with its upper reach disposed between said brackets; of a plurality of bars adjustably connected to said brackets and projecting inwardly to points adjacent said fish carrying member, shafts mounted for rotation between said bars on each side of said carrying member, upright brushes mounted on said shafts to rotate therewith, whereby to clean the fish carried by said member moving through the frame, and means in connection with the upper ends of said shafts on each side of the aforesaid carrying member for rotating the same alternately in reverse directions.

7. In a machine of the class described, the combination with a frame, a series of U-shaped brackets secured to the side bars thereof and having slots in their horizontal arms, and a fish carrying belt moving throughout the length of the machine with its upper stretch between said brackets; of bars overlying the arms of said brackets and having bearings, bolts through said bars and slots whereby the former are adjustably mounted on the brackets, upright shafts journaled in said bearings, upright brushes whose hubs are mounted on said shafts and whose bristles clean the outside of the fish, beveled gears on the upper ends of said shafts, uprights rising from the uppermost bars, a drive shaft extending through all of the uprights and having a series of beveled gears engaging those on the shafts, and means for rotating said drive shaft.

8. In a machine of the class described, the combination with a frame, a series of U-shaped brackets secured to the side bars therein and having slots in their horizontal arms, the inner ends of the lower arms being upturned and provided with notches, a series of idlers having stub shafts removably mounted in said notches, and a fish-carrying belt moving throughout the length of the machine with its upper stretch passing over said idlers and between said brackets; of bars overlying the arms of said brackets and having bearings, bolts through said bars and slots whereby the former are adjustably mounted on the brackets, upright shafts journaled in said bearings, upright brushes whose hubs are mounted on said shafts and whose bristles clean the outside of the fish, beveled gears on the upper ends of said shafts, bearings carried by the uppermost bars of all the brackets, drive shafts journaled in said bearings, and beveled driving gears on these shafts engaging the beveled gears on the upright shafts and rotating the latter alternately in opposite directions, for the purpose set forth.

9. In a machine of the class described, the combination with a frame, a series of U-shaped brackets secured to the side bars therein, and a fish-carrying belt moving throughout the length of the machine with its upper stretch passing between said brackets; of bars overlying the arms of said brackets and having bearings, bolts through said bars and arms whereby the former are adjustably mounted on the brackets, upright shafts journaled in said bearings, upright brushes whose hubs are mounted on said shafts and whose bristles clean the outside of the fish, beveled gears on the upper ends of said shafts, bearings carried by the uppermost bars of all brackets, drive shafts journaled in said bearings, and beveled driving gears on these shafts engaging the beveled gears on the upright shafts and rotating the latter alternately in opposite directions, for the purpose set forth.

10. In a fish dressing machine, the combination with mechanism for supporting the fish in a horizontal position and carrying it through the machine; of a transverse support mounted on the machine-frame and having a longitudinal slot above said carrying mechanism, a knife whose shank projects loosely through said slot and whose cutting edge stands below the same, a pivot between the shank and support at a point above the slot, a spring holding the knife with its cutting edge in substantially upright position, and divergent wings in rear of said cutting edge, for the purpose set forth.

In testimony whereof I have hereunto set my hand in presence of two subscribing witnesses.

HOWARD P. LAMOREAUX.

Witnesses:
WILLIAM G. KIERSTEAD,
SABINE L. CARR.